United States Patent [19]

MacDougall

[11] Patent Number: 5,534,917
[45] Date of Patent: Jul. 9, 1996

[54] VIDEO IMAGE BASED CONTROL SYSTEM

[75] Inventor: Francis MacDougall, North York, Canada

[73] Assignee: Very Vivid, Inc., Toronto, Canada

[21] Appl. No.: 697,584

[22] Filed: May 9, 1991

[51] Int. Cl.$^6$ ............................ H04N 5/262; H04N 5/272
[52] U.S. Cl. ........................ 348/169; 348/578; 348/586
[58] Field of Search .................................. 358/125, 105, 358/107, 93, 108, 136; 348/384, 169, 170–172, 390, 578, 586; H04N 5/262, 5/272

[56] References Cited

U.S. PATENT DOCUMENTS

| | | |
|---|---|---|
| 3,836,710 | 9/1974 | Takahashi . |
| 3,932,703 | 1/1976 | Bolsey . |
| 4,145,043 | 3/1979 | Olliges . |
| 4,254,433 | 3/1981 | Dewar, Jr. et al. .................. 358/105 |
| 4,272,787 | 6/1981 | Michael et al. . |
| 4,364,087 | 12/1982 | Storey et al. . |
| 4,408,224 | 10/1983 | Yoshida . |
| 4,468,694 | 8/1984 | Edgan ............................. 358/93 |
| 4,710,873 | 12/1987 | Breslow et al. ................... 364/410 |
| 4,739,400 | 4/1988 | Veitch ............................ 358/108 |
| 4,843,568 | 6/1989 | Krueger et al. . |
| 4,958,378 | 9/1990 | Bell . |
| 5,057,919 | 10/1991 | de Haan et al. ................... 358/136 |
| 5,122,873 | 6/1992 | Golin ............................ 348/384 |
| 5,196,929 | 3/1993 | Miyasaka ......................... 348/169 |
| 5,204,749 | 4/1993 | Toyama et al. .................... 348/169 |
| 5,220,441 | 6/1993 | Gerstenberger .................... 358/107 |

*Primary Examiner*—Tommy P. Chin
*Assistant Examiner*—Vu Le
*Attorney, Agent, or Firm*—Brooks & Kushman

[57] ABSTRACT

A video image based control system including a video camera scans a field of view and generates video signals representing the captured image of the field of view. The video signals are applied to a digitizer which converts the video signal into digital information. The digital information is conveyed to a computer and stored. The computer then performs an AND function on the stored digital information and on bitmaps stored in the computer memory associated with predefined areas of interest in the field of view of the video camera to determine whether a participant in the field of view is positioned so that at least a portion of the participant is located in an area of interest. If the participant is detected as being within an area of interest, the computer determines the proportion of the area of interest obscured by the participant and generates a control signal having a value dependant on the proportion of the area of interest obscured by the participant. The control signal is then applied to a dependant control device. In addition, the computer provides signals to a display representing the captured image superimposed on another image showing the areas of interest within the field of view to provide visual feedback to the participant. In this manner, the participant is capable of controlling the operation of the dependant control through movement within the field of view of the video camera.

42 Claims, 13 Drawing Sheets

| 1 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|
| 0 | 1 | 0 | 0 | 0 | 0 | 0 | 0 | 0 | 0 | 0 | 0 | 0 | 1 | 0 |
| 0 | 0 | 1 | 0 | 0 | 0 | 0 | 0 | 0 | 0 | 0 | 0 | 1 | 0 | 0 |
| 0 | 0 | 0 | 1 | 0 | 0 | 0 | 0 | 0 | 0 | 0 | 1 | 0 | 0 | 0 |
| 0 | 0 | 0 | 0 | 1 | 0 | 0 | 0 | 0 | 0 | 1 | 0 | 0 | 0 | 0 |
| 0 | 0 | 0 | 0 | 0 | 1 | 0 | 0 | 0 | 1 | 0 | 0 | 0 | 0 | 0 |
| 0 | 0 | 0 | 0 | 0 | 0 | 1 | 0 | 0 | 1 | 0 | 0 | 0 | 0 | 0 |
| 0 | 0 | 0 | 0 | 0 | 0 | 0 | 1 | 1 | 0 | 0 | 0 | 0 | 0 | 0 |
| 0 | 0 | 0 | 0 | 0 | 0 | 1 | 1 | 0 | 0 | 0 | 0 | 0 | 0 | 0 |
| 0 | 0 | 0 | 0 | 0 | 0 | 1 | 0 | 0 | 1 | 0 | 0 | 0 | 0 | 0 |
| 0 | 0 | 0 | 0 | 0 | 1 | 0 | 0 | 0 | 0 | 1 | 0 | 0 | 0 | 0 |
| 0 | 0 | 0 | 0 | 1 | 0 | 0 | 0 | 0 | 0 | 0 | 1 | 0 | 0 | 0 |
| 0 | 0 | 0 | 1 | 0 | 0 | 0 | 0 | 0 | 0 | 0 | 0 | 1 | 0 | 0 |
| 0 | 0 | 1 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 0 | 1 | 0 |
| 1 | 0 | 0 | 0 | 0 | 0 | 0 | 0 | 0 | 0 | 0 | 0 | 0 | 0 | 1 |

FIG.3

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 1 | 1 | 1 | 1 | 0 | 0 | 0 | 0 | 0 | 0 |
| 0 | 0 | 0 | 0 | 0 | 1 | 1 | 1 | 1 | 1 | 0 | 0 | 0 | 0 | 0 |
| 0 | 0 | 0 | 0 | 1 | 1 | 1 | 1 | 1 | 1 | 0 | 0 | 0 | 0 | 0 |
| 0 | 0 | 0 | 1 | 1 | 1 | 0 | 0 | 0 | 1 | 1 | 1 | 0 | 0 | 0 |
| 0 | 0 | 0 | 1 | 1 | 1 | 0 | 0 | 0 | 1 | 1 | 1 | 0 | 0 | 0 |
| 0 | 0 | 0 | 1 | 1 | 1 | 0 | 0 | 0 | 1 | 1 | 1 | 0 | 0 | 0 |
| 0 | 0 | 0 | 1 | 1 | 1 | 0 | 0 | 0 | 1 | 1 | 1 | 0 | 0 | 0 |
| 0 | 0 | 0 | 1 | 1 | 1 | 0 | 0 | 0 | 1 | 1 | 1 | 0 | 0 | 0 |
| 0 | 0 | 0 | 1 | 1 | 1 | 0 | 0 | 0 | 1 | 1 | 1 | 0 | 0 | 0 |
| 0 | 0 | 0 | 0 | 1 | 1 | 1 | 1 | 1 | 1 | 1 | 0 | 0 | 0 | 0 |
| 0 | 0 | 0 | 0 | 0 | 1 | 1 | 1 | 1 | 1 | 0 | 0 | 0 | 0 | 0 |
| 0 | 0 | 0 | 0 | 0 | 0 | 1 | 1 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG.4

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 1 | 0 | 0 | 0 | 0 |
| 0 | 0 | 0 | 0 | 0 | 1 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 1 | 0 | 0 | 0 | 0 |
| 0 | 0 | 0 | 0 | 1 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG.5

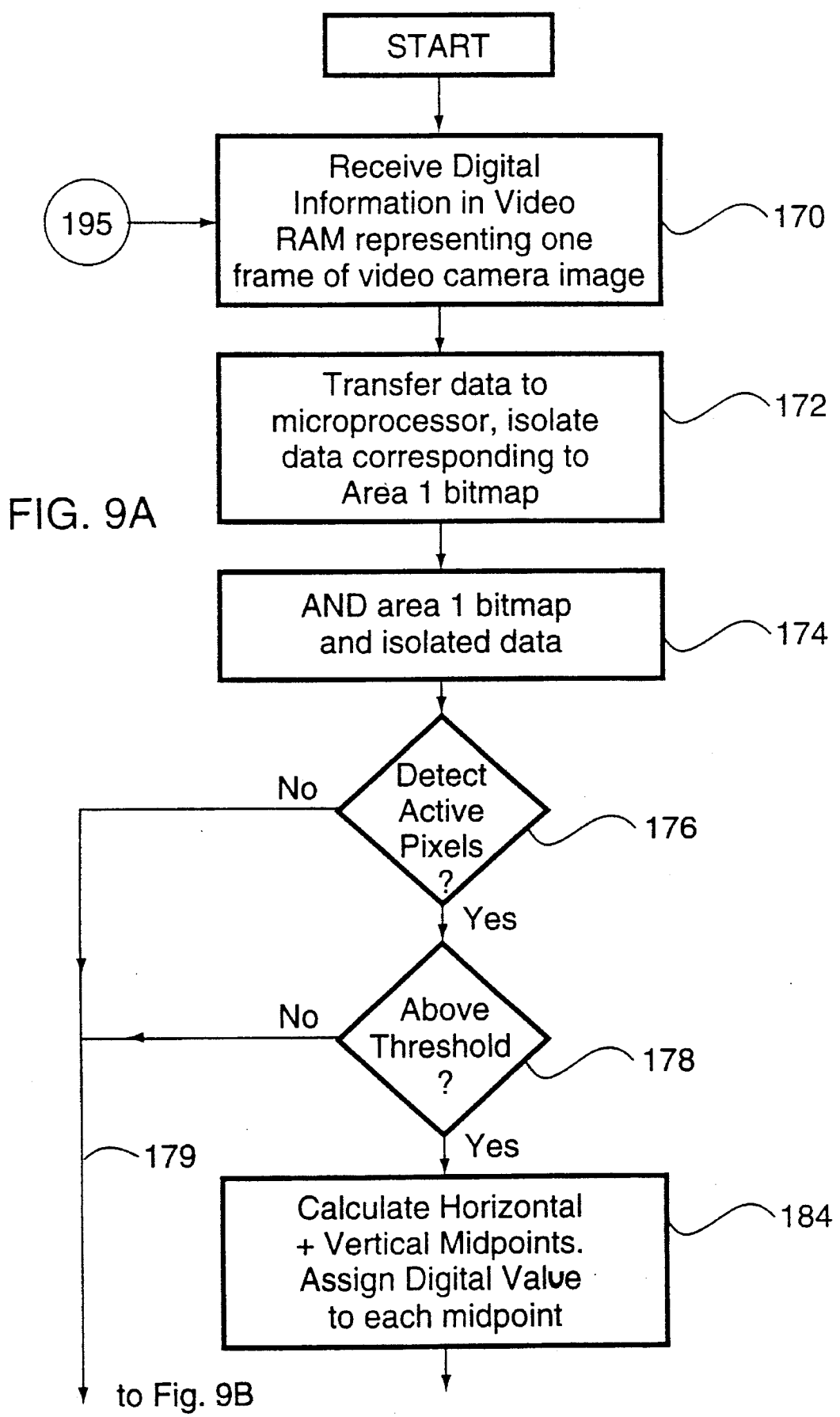

| Assigned Value | X and Y co-ordinate |
|---|---|
| 1 | (1,0) |
| 2 | (5,0) |
| 3 | (-5,0) |
| 4 | (-1,0) |
| 5 | (0,-1) |
| 6 | (0,-5) |
| 7 | (0,5) |
| 8 | (0,1) |
| 9 | (3,-3) |
| 10 | (3,3) |
| 11 | (-3,-3) |
| 12 | (-3,3) |
| 0 | (0,0) |

VIDEO IMAGE BASED CONTROL SYSTEM

FIELD OF THE INVENTION

The present invention relates to a video image based control system.

BACKGROUND OF THE INVENTION

Video image based control systems for controlling the operation of a device in response to the movement of a participant in the field of view of a video camera are known in the art. One prior art system designed by the Applicant which operates based on this principal is entitled "Mandala" (Trademark). This system includes a video camera which scans a field of view in which a participant stands. The output of the video camera is applied to a video digitizer which provides digital output to a computer. The computer analyses and processes the digital information received from the digitizer and depending on the movement or position of the participant within the field of view of the video camera, provides control signals to dependent control devices connected thereto. Thus, the operation of the dependant control device can be controlled by the movement or positioning of the participant within the field of view of the video camera.

Other attempts have been made to develop similar types of systems, one of which is disclosed in U.S. Pat. No. 4,843,568 to Krueger et al. This reference shows an apparatus which uses the image of a human to control real-time computer events. Data representing a participant are gathered via a camera and applied to a processor. The processor analyses the data to detect certain features of the image and the results of the analysis are expressed to the participant using devices controlled by a computer.

Although the above-mentioned systems allow a device to be controlled through movement or positioning of a participant within the field of view of a camera, the type of control offered by these prior art systems is limited and thus, these prior art devices have limited usefulness in environments which require more sophisticated control.

It is therefore an object of the present invention to provide a novel video image based control system.

SUMMARY OF THE INVENTION

According to one aspect of the present invention, there is provided a video image based control system comprising:

video imaging means for scanning a field of view occupied by a participant;

processing means in communication with said video imaging means and converting the output thereof into digital video information; and memory means storing information concerning at least one predefined area of interest within said field of view, said processing means performing operations on said information in said memory means and said digital video information to determine whether at least a portion of said participant is in said area of interest and the proportion of said area of interest occupied by said participant, said processing means generating output signals having values dependant on the proportion of said area of interest occupied by said participant for controlling an external device.

According to another aspect of the present invention there is provided a video image based control system comprising:

video imaging means for scanning a field of view occupied by a participant;

processing means in communication with said video imaging means and converting the output thereof into digital video information; and memory means storing information concerning at least one predefined area of interest within said field of view, said processing means performing operations on said information in said memory means and said digital video information to determine whether at least a portion of said participant is in said area of interest and further determining the horizontal and vertical midpoints of the portion of said participant within area of interest occupied by said participant, said processing means generating output signals having values dependant on the determined horizontal and vertical midpoints for controlling an external device.

Preferably, the systems also include display means in communication with the processing means and providing a visual image of the field of view including the area of interest and the movement and position of the participant therein. In the one aspect of the present invention it is preferred that the output signals generated by the processing means have values which are linearly dependant on the proportion of the area of interest occupied by the participant.

Preferably, a number of areas of interest are predefined within the field of view, information concerning each of which is stored in the memory means. In this case, the processing means examines the information in the memory means and the digital video information to determine whether at least a portion of the participant is located in any or all of the areas of interest and generates appropriate output signals depending on which areas of interest the participant is located.

Preferably, the processing means converts the digital video information into a bitmap representing the field of view and that the memory means stores bitmaps representing the predefined areas of interest within the field of view, the processing means performing an AND function on the bitmaps in the memory means and the bitmap representing the field of view to determine whether the participant is located in the areas of interest.

Preferably, the processing means requires a threshold portion of the areas of interest to be occupied by the participant before output signals are generated thereby to constitute a noise filter. It is also preferred that the threshold portion is designated as a predetermined number or pattern of contiguous bits in an area of interest detected as being occupied by the participant.

According to still yet another aspect of the present invention there is provided a video image control system comprising:

video imaging means for scanning successive frames a field of view occupied by a participant;

processing means in communication with said video imaging means and converting the output thereof for each of said frames into digital video information; and memory means storing information concerning at least one predefined area of interest within said field of view, said processing means performing operations on said information in said memory means and said digital video information for each of said frames to determine whether at least a portion of said participant is in said area of interest, said processing means further determining changes in position of said participant within said field of view for successive frames and calculating the speed of said participant moving in said field of view, said processing means generating output signals having values dependant on the calculated speed for controlling the operation of an external device.

The present invention provides advantages in that areas of interest within the field of view are specified and examined to determine whether the areas of interest are occupied by the participant. Once a participant is located within an area of interest, the area of interest is further examined and output signals are generated having values dependant on certain characteristics detected during the further examination. Since the values of the output signals change depending on the detected characteristics, more sophisticated control of a dependant control device can be achieved using the present system.

BRIEF DESCRIPTION OF THE DRAWINGS

Embodiments of the present invention will now be described with reference to the accompanying drawings in which:

FIG. 1b is a schematic view of a portion of the system shown in FIG. 1a;

FIG. 3 illustrates a bitmap generated by a video image based control system the prior art system shown in FIG. 1;

FIG. 4 illustrates another bitmap stored in a video image based control system;

FIG. 5 is an illustration of a resultant bitmap obtained by performing an AND function on the bitmaps shown in FIGS. 3 and 4;

FIGS. 9a to 9c show a flow chart illustrated the operation of the system shown in FIG. 6;

DESCRIPTION OF THE PREFERRED EMBODIMENTS

Figure 1A:
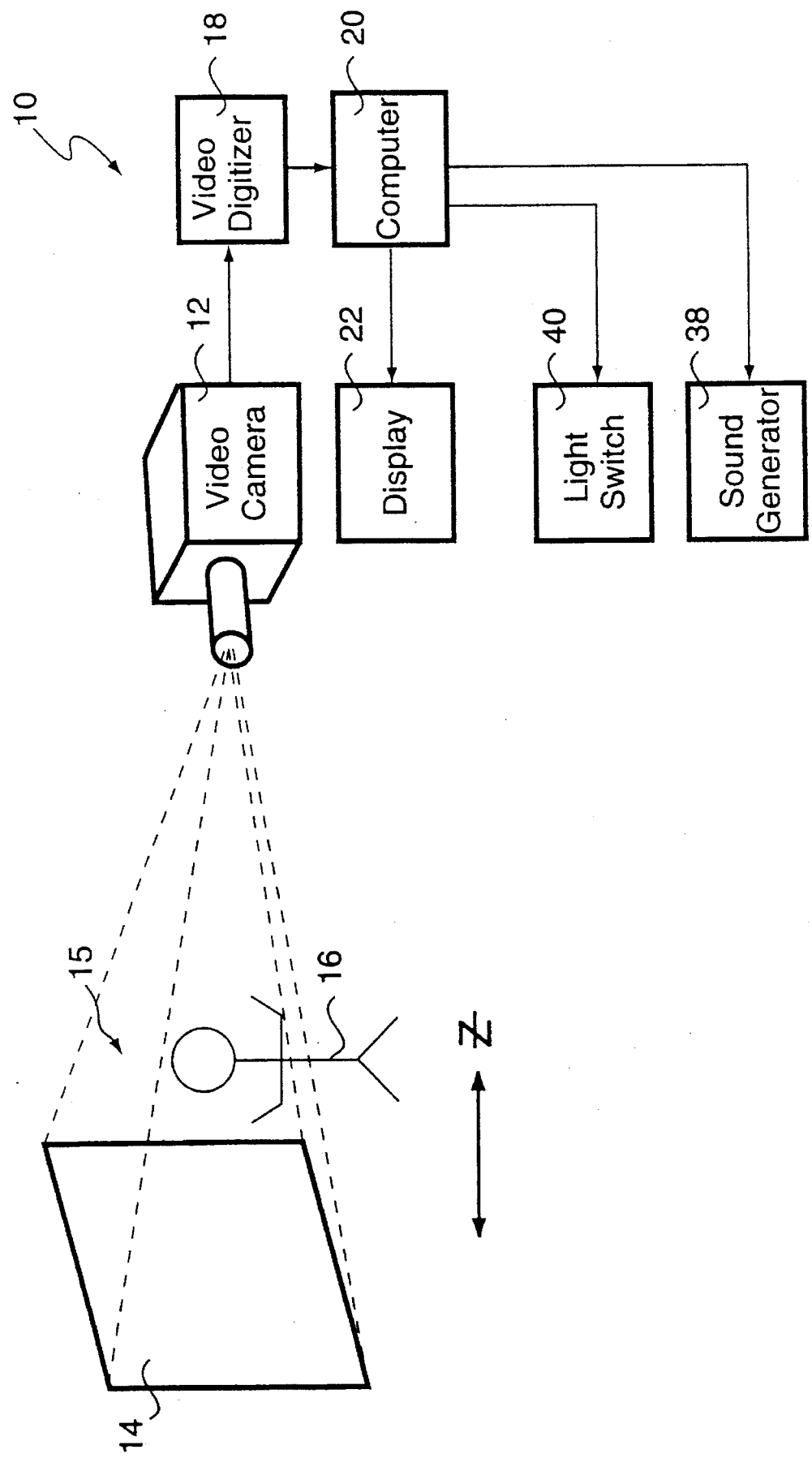
FIG. 1a is a schematic view of a prior art video image based control system.
Figure 1B:
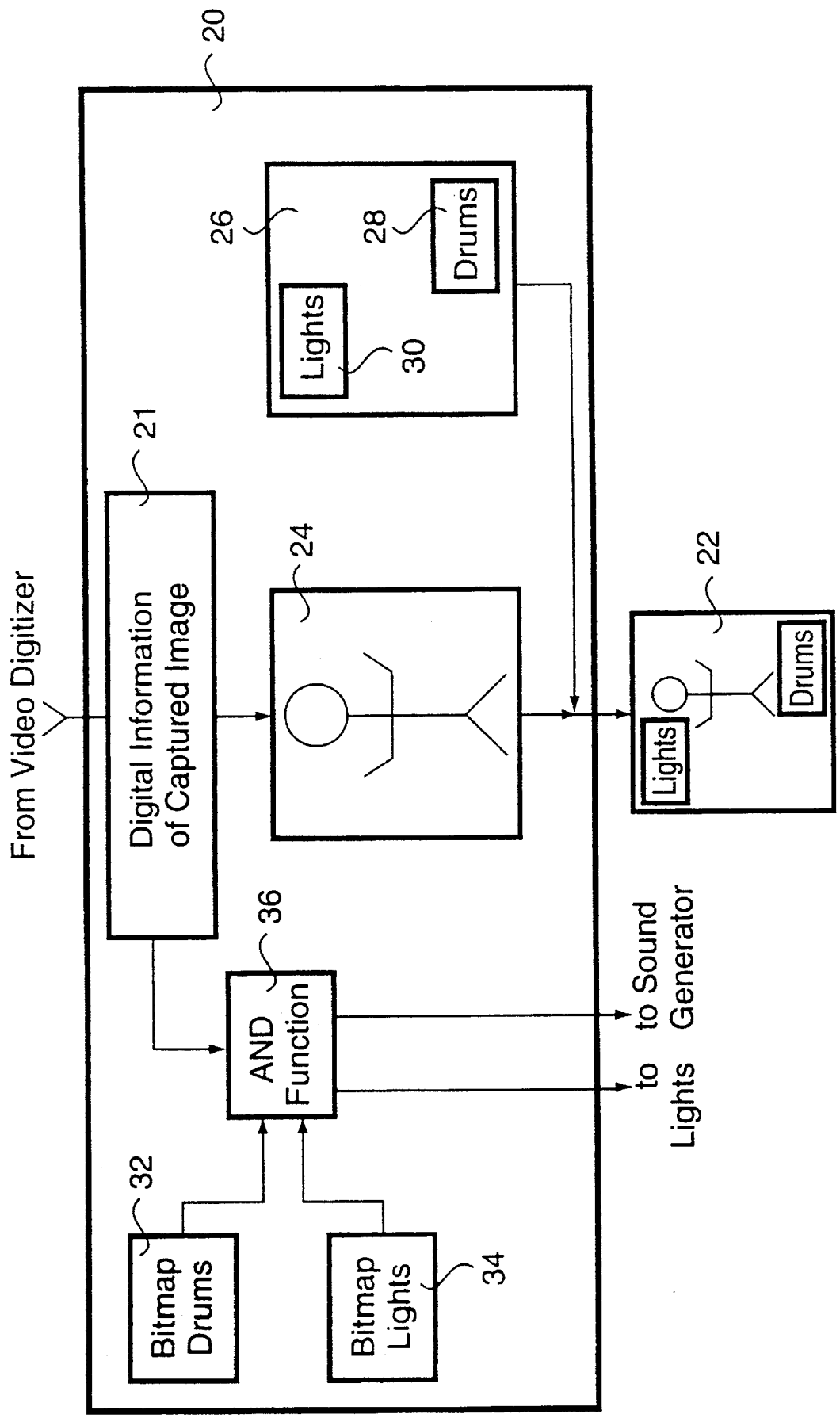

For the sake of clarity and to exemplify the operation of the present invention, the prior art Mandala video image based control system referred to above and generally indicated by reference numeral 10 will be described with reference to FIGS. 1 to 4.

Figure 2:
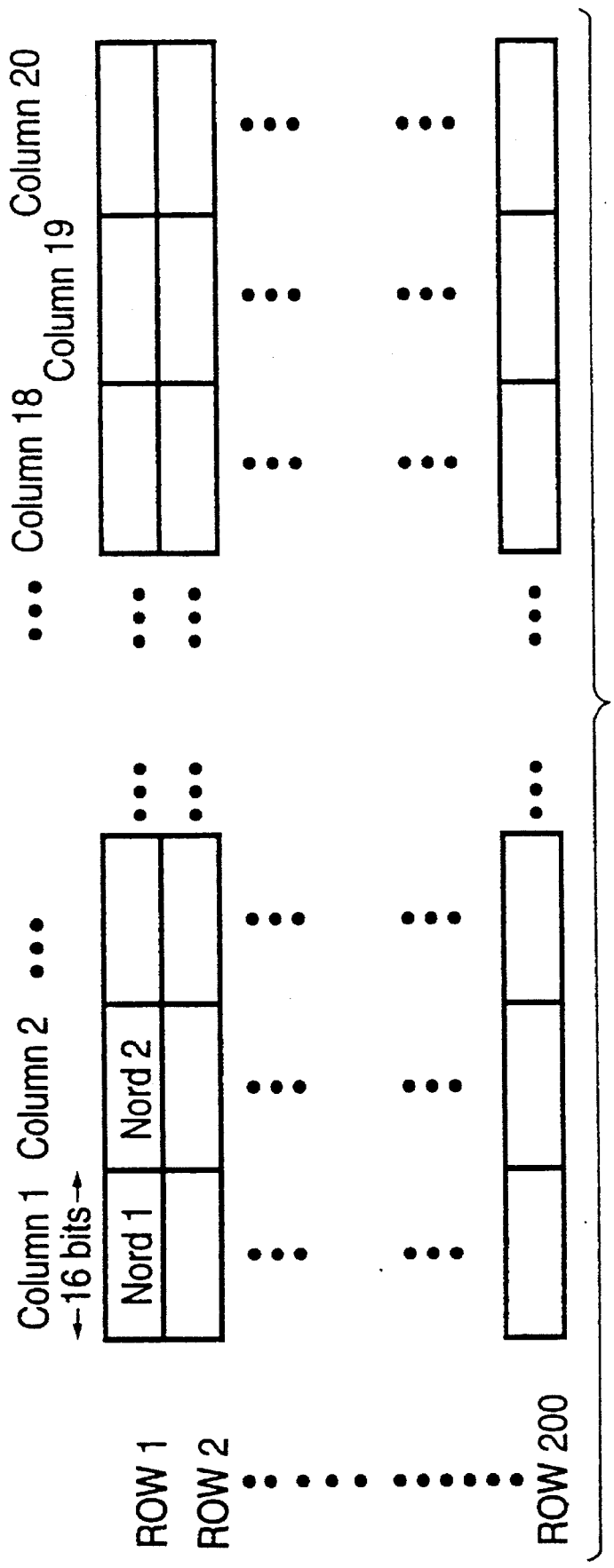
FIG. 2 is a schematic view of an organization of digital information stored in a computer.

As can be seen from FIGS. 1 and 2, the system 10 includes a video camera 12 spaced from a background 14 in the form of a wall or flexible sheet, along an axis Z which is in the field of view 15 of the video camera 12. A participant 16 is shown standing between the video camera 12 and the background 14 so that an image of the participant 16 and the background 14 is captured by the video camera 12. The video camera 12 is connected to a video digitizer 18. The video digitizer 18 receives video signals from the video camera 12 representing the captured image and outputs a digital representation of the captured image in the form of a 320 pixel wide by 200 pixel high array of bits or a bitmap to a computer 20, with each bit representing one picture element or pixel of the image captured by the video camera 12. The computer 20 in turn stores the bitmap representing the captured image as 4,000 consecutive, 16 bit words (as is indicated by reference numeral 21), each row of the bitmap of the array constituting 20 words (best shown in FIG. 2). The computer 20 processes the stored digital information 21 in a manner determined by software and hardware therein as will be described. Although the participant is shown to represent a person, it should be realized that any object moving within the field of view of the video camera and within an area of interest is considered to be a participant within the meaning of the present application.

The computer 20 is also connected to a display 22 and provides to the display 22, signals corresponding to the stored digital information 21 representing the captured image 24 of the field of view 15 of the video camera 12 superimposed on another image 26 (FIG. 1b) generated by software stored in the computer 20. Within the image 26 stored in the computer 20 are two predefined rectangular areas of interest 28, 30, one 28 of which is designated "Drums" and the other 30 of which is designated "Lights". Stored in memory within the computer 20 are bitmaps or masks 32, 34 comprising an arrangement of logic high "1" bits. Each bitmap 32, 34 is associated with and represents one of the areas of interest 28, 30 respectively. In this case, the bitmaps include a logic high "1" bit corresponding to each pixel in the rectangular areas of interest 28, 30 although this configuration is not necessary. For example, the areas of interest may be of any configuration such as the circular annulus shown in FIG. 4.

An AND function 36 is also shown in the computer 20 and receives the bitmaps 32, 34 and the stored digital information 21. The AND function 36 generates logic output signals which are used by the computer 20 to operate dependant control devices exterior to the computer 20, such as in this example, a sound generator 38 and a light switch 40.

The operation of the prior art Mandala system 10 will now be described with reference to FIGS. 1 to 5. In operation, when the system 10 is on and a participant 16 is standing between the video camera 12 and the background 14, the field of view 15 of the video camera 12 is captured by the video camera as an image. The captured image is then applied to the video digitizer 18 for conversion into digital form. The video digitizer 18 is conditioned to output a logic bit for each pixel in the captured image with the bits having a logic high "1" value for areas in the captured image where the background 14 is obscured by the participant 16 and a logic low "0" value for areas in the captured image where the background 14 is visible. For example, FIG. 3 shows the bitmap generated by the video digitizer 18 when an "X" shaped object is positioned in front of the background 14 within the field of view 15 of the video camera 12.

The logic bits output by the video digitizer 18 are received by the computer 20 and are stored therein as digital information 21 in the form of consecutive words in the manner described above. Software in the computer receives the digital information 21 and the bitmaps 32, 34 and performs the logic AND function 36. Thus, the AND function 36 compares each bit representing a pixel of the digitized captured image to the corresponding bit in the bitmaps 32, 34 representing the areas of interest 38, 40 within the field of view 15 of the video camera 12. As is known to those of skill in the art, if both bits have a logic high "1" value indicating that at least a portion of the participant 16 is located in the area of interest, the AND function returns a logic high "1" value. If either, or both, bits have a logic low "0" value, then the AND function 36 returns a logic low "0" value. To illustrate the above operation, the resultant bitmap of the AND function 36 performed on the bitmap of FIG. 3 and the bitmap of FIG. 4 is shown in FIG. 5.

Thus, if the participant 16 is positioned within the field of view 15 of the video camera 12 so that at least a portion of participant is detected as being within one of the areas of interest 38, 40, the AND function 36 generates a bitmap having at least one logic high "1" bit. The generation of a logic high "1" bit in the resultant bitmap is used by the computer 20 to generate an output control signal to operate the control device associated with area of interest. Accordingly, if the participant 16 is detected in area of interest 28, the computer 20 provides a control signal to operate the sound generator 38 so that a drum beat is broadcast. Similarly, if the participant 16 is located in the area of interest 30, the computer 20 provides a control signal to the light switch 40 to turn on a bank of lights.

The operation of the dependant control devices 38, 40 by the computer 20 continues until the participant 16 moves within the field of view 15 of the video camera 12 so that the participant 16 is no longer within any of the areas of interest when an image of the field of view is captured by the video camera. This of course results in the AND function 36 generating a bitmap having only logic low "0" bits. As should be apparent, the operation of the system 10 in this manner is analogous to a hardware ON/OFF switch, with the position or movement of the participant 16 within the field of view 15 of the video camera 12 determining the ON/OFF state of the hardware switch. The period of time that the computer 20 conditions the dependant control devices 38, 40 to an ON condition depends upon the number of digitized representations of frames output by the video camera 12 that are processed by the video digitizer 18 and the computer 20 in each second. If, for example, twenty four frames of video data are processed per second by the video digitizer 18 and the computer 20 and the participant 16 moves through an area of interest in the field of view 15 of the video camera 12 within a single frame, the computer 20 conditions the control device associated with that area of interest to an ON condition for only one twenty-fourth of a second.

As the computer 20 is performing the AND function 36, the computer also provides signals to the display 22 representing the captured image 24 and the stored image 26 so that display provides visual feedback to the participant. This allows the position of the participant 16 to be determined visually with respect to the areas of interest 38, 40. In this way, the participant 16 can move into and out of the areas of interest as desired to activate or deactivate operation of the dependant control devices 38, 40.

In addition to operating the dependant control devices in the desired manner, the ON/OFF state of a given area of interest may also be signalled to the participant 16 through the use of standard computer graphic interface techniques such as inverse highlight, image substitution, flashing areas, etc. This method of providing visual feedback to the participant 16 is particularly useful in environments where the operation of the dependant control device cannot be readily determined by the participant.

In addition to the above ON/OFF operation, the prior art Mandala system also can be conditioned to operate in another mode which permits "Horizontal Tracking" of the movement of a participant 16 within an area of interest in the field of view 15 of the video camera 12. This mode is suitable for use in controlling the movement of a dependant control device such as for example, a robotic arm.

When performing Horizontal Tracking, the computer 16 determines whether the participant 16 is in an area of interest in the same manner as described above using the AND function 36. When the participant 16 is detected as being in the area of interest, the computer 20 examines the position of the pixels in the resultant bitmap having a logic high "1" value to determine the leftmost, or rightmost logic high "1" bits returned by the AND function. This of course represents the rightmost or leftmost point within the area of interest which is "touched" or obstructed by the participant 16.

The bitmap representing the area of interest within the field of view is then adjusted by the computer 20 so that the detected rightmost or leftmost point of the participant 16 in the area of interest as previously located now corresponds to the centre of the area of interest as adjusted by the computer. Horizontal movement of the participant 16 from the centre position to another position within the adjusted area of interest is detected in the same manner described above using the AND function. The length of the horizontal movement is calculated by the computer 20 and is used by the computer to generate control signals for moving the dependant control device, in this case a robotic arm, in a manner analogous to the participant's horizontal movement within the area of interest. Thus, the robotic arm may be moved using the system 10 horizontally along a straight line within a fixed plane. It should be realized that while these operations are occurring, signals representing an overlay of the captured image 24 and the stored image 26 showing the adjusted area of interest within the field of view 15 are conveyed to the display 22 which in turn provides visual feedback to the participant 16.

Although the prior art system described above permits the movement or positioning of a participant in the field of view of the video camera 12 to be used to operate a dependant control device, the control functions permitted by the system 10 are limited due to the simple nature of the ON/OFF and straight line, fixed plane, Horizontal Tracking detection functions performed by the computer.

To provide enhanced control for dependant control devices used in conjunction with a video image based control system, the present video image based control system has been designed. The present system is similar to the prior art system 10 described previously yet provides enhanced control capabilities by implementing more sophisticated detection systems for examining areas of interest within the field of view of the video camera as will now be described.

Figure 6:
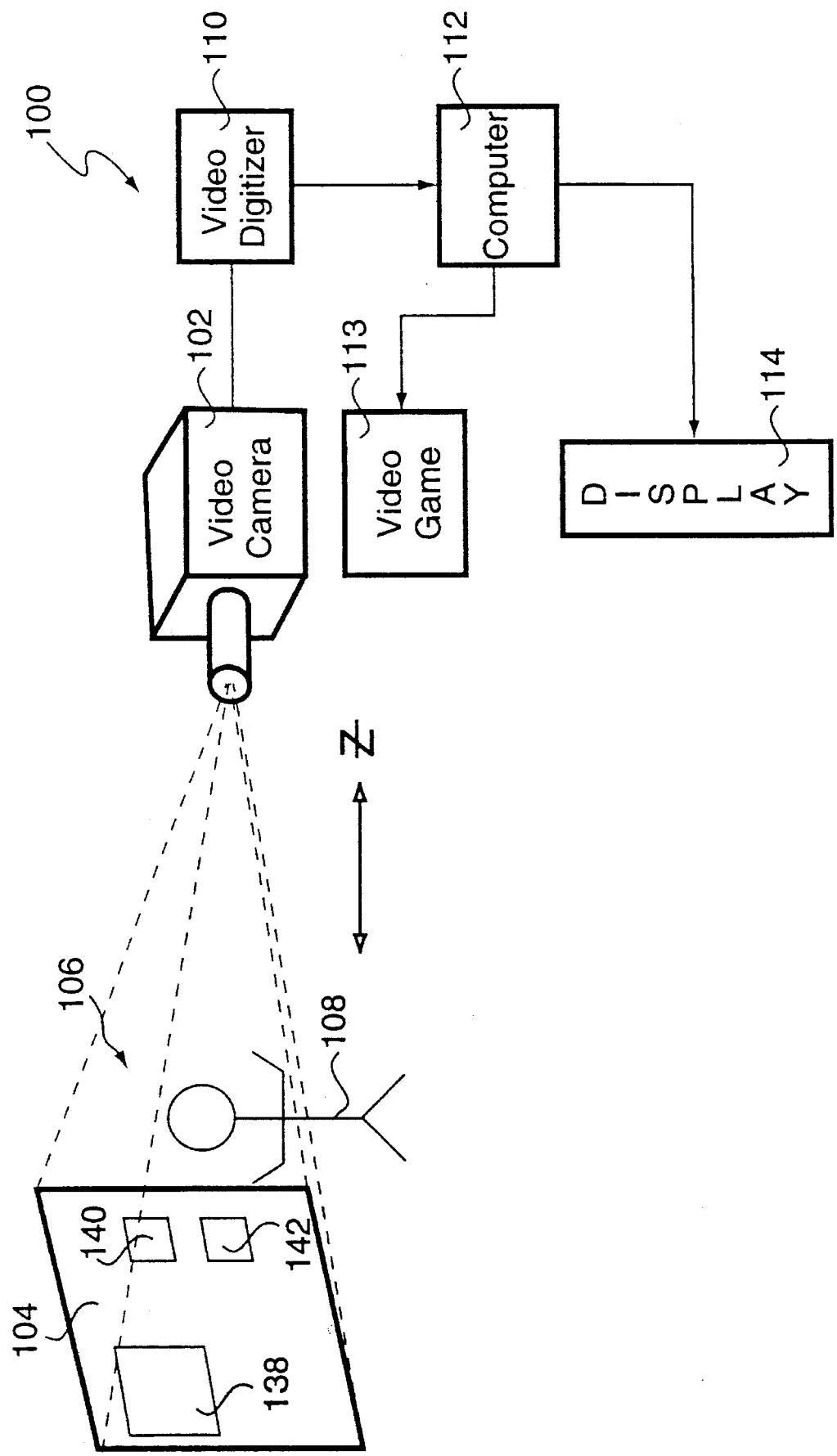
FIG. 6 is a schematic view of the present video image control system.
Figure 7A:
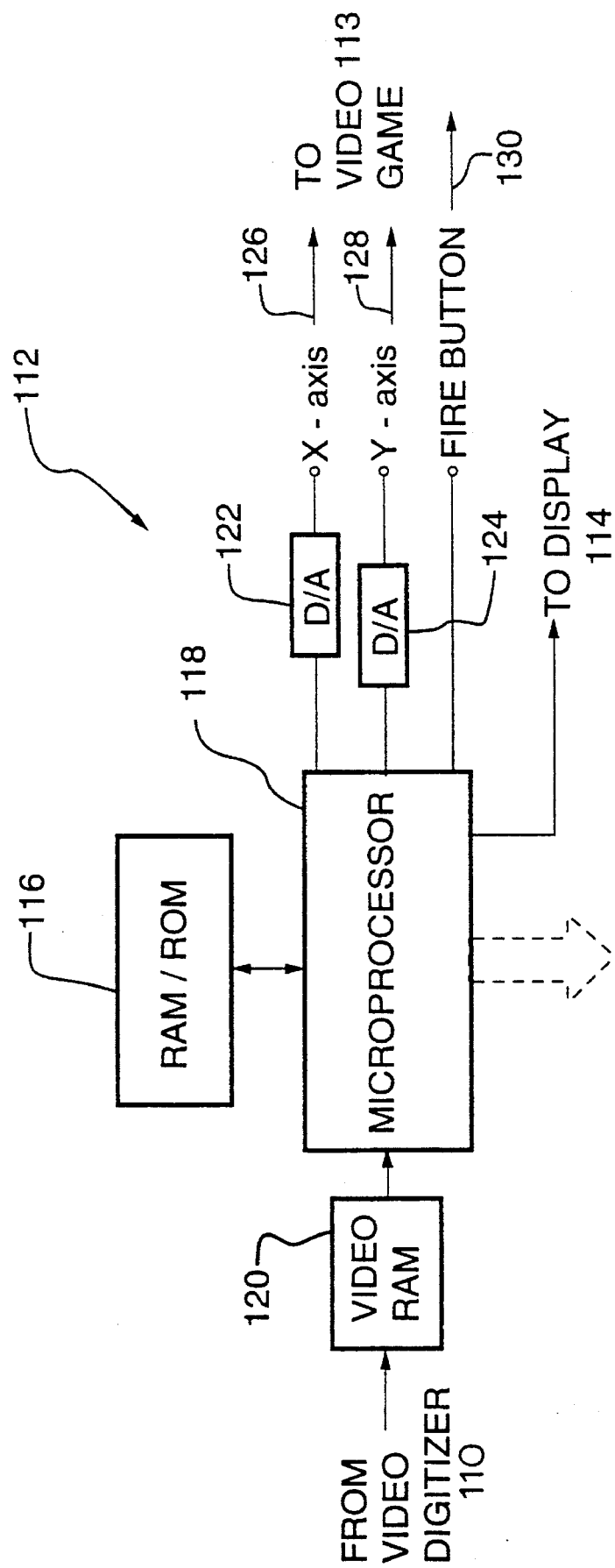
FIG. 7 is block diagram of a portion of the system shown in FIG. 6.
Figure 7B:
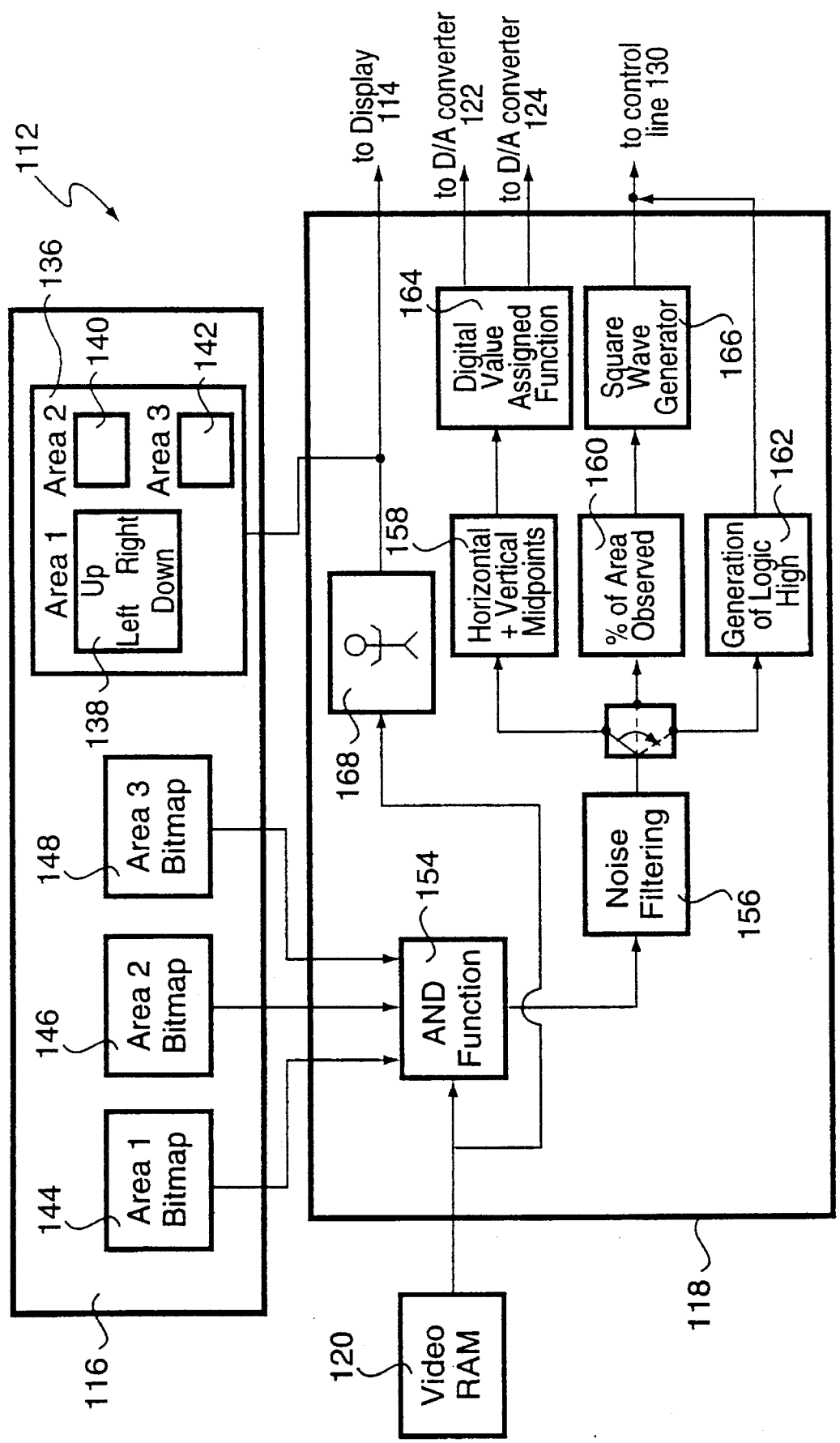
Figure 8:
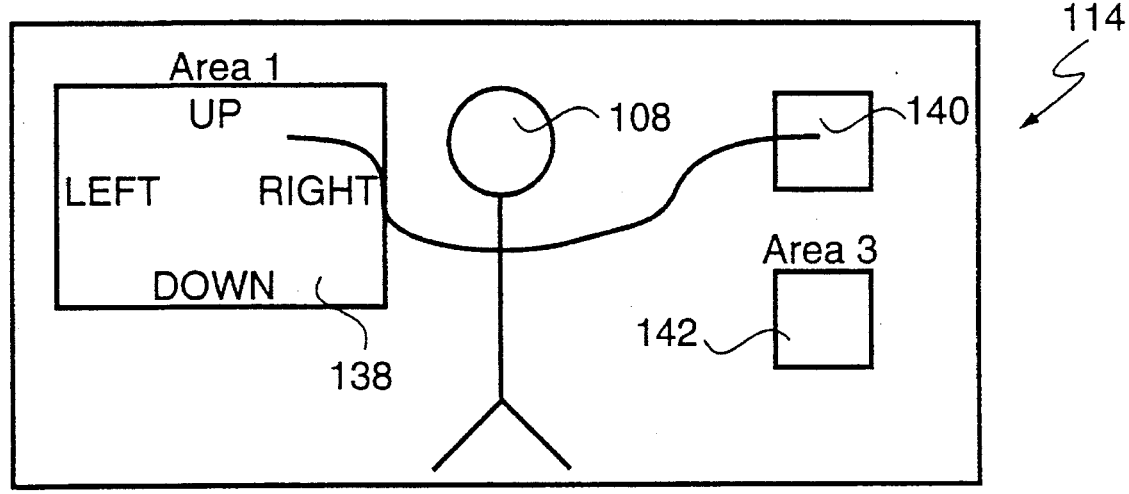
FIG. 8 is schematic view of a portion of the system shown in FIG. 5 showing predefined areas of interest.

Referring now to FIGS. 6 to 8, a first embodiment of a video image based control system is shown and is generally indicated by reference numeral 100. In this example, the system 100 is in the form of a video image based "joystick". Similar to the system 10, the present system 100 includes a video imaging camera 102 spaced from a background 104 along an axis Z but within the field of view 106 of the video camera 102. A participant 108 is shown standing between the background 104 and the video camera 102 within the field of view 106. A video digitizer 110 processes successive frames of the captured image of the field of view 106 taken by the video camera 102 and conveys the digitized representation of the captured image to a computer 112. Similar to that described with reference to the prior art system 10, the computer 112 stores the digitized information received from the video digitizer 110 in the form of an array of digital words (see FIG. 2). The computer 112 is also connected to a video game 113 which operates in accordance with signals received from the computer and to a display 114 which provides visual feedback to the participant 108.

A block diagram of the computer 112 is shown in FIG. 7a. As can be seen, the computer 112 includes a memory 116 in the form of random access memory (RAM) and/or read only memory (ROM) connected to a microprocessor 118. The memory 116 stores the necessary operating software and preprogrammed information as will be described. Additional RAM memory in the form of video RAM 120 is provided and receives the output of the video digitizer 110. The video RAM 120 in turn provides the stored digital information therein to the microprocessor 118 wherein it is placed in an appropriate format and processed as required.

A pair of digital to analog (D/A) converters 122, 124 are connected to different output lines of the microprocessor 118 and receive output signals therefrom. D/A converter 122 in turn provides analog output signals on an "X-axis" control line 126 while D/A converter 124 provides analog output signals on a "Y-axis" control line 128. The microprocessor 118 also provides output signals directly on a "fire" button control line 130. The output signals on the control lines 126, 128 and 130 are applied to the dependant control device connected thereto, in this example, the video game 113. This allows the participant 108 to control the video game 113 via his/her movement as will be described.

Referring now to FIG. 7b, the computer 112 is better illustrated highlighting some of the functions it performs. As can be seen, the memory 116 is shown as storing image information 136 which includes within it, three areas of interest 138, 140 and 142, labelled as area 1, area 2 and area 3 respectively. Also within the memory 116 are bitmaps 144, 146 and 148, each bitmap of which is associated with and represents one of the areas of interest. Similar to the prior art embodiment, the bitmaps are in the form of rectangular areas and include a logic high "1" bit corresponding to each pixel in the areas of interest. Although only the image information 136 and the bitmaps 144, 146 and 148 are illustrated as being stored in the memory, it should be apparent that other information necessary to operate the microprocessor 118 in the desired manner is also stored in the memory 116.

As mentioned previously, the microprocessor 118 receives the stored information from the memory 116 and the stored digital information in the form of a bitmap (see FIGS. 2 and 3) representing the captured image of the video camera's field of view 106 from the video RAM 120. Similar to the prior art system, the microprocessor 118 performs an AND function 154 on the bitmaps received from the memories 116, 120 respectively to determine whether the participant 108 is within one or more of the areas of interest 138, 140 and 142. The resultant bitmaps of the AND function 154 are further processed by the microprocessor 118 if required upon detection of the participant within the areas of interest. The further processing of the resultant bitmaps is indicated by blocks 156, 158, 160, 162, 164 and 166 respectively and will be discussed in more detail with reference to the operation of the system 100.

The microprocessor 118 uses the output of the processes to generate control signals for application to the video game 113. In this instance, the control signals generated by the computer 112 as a result of processes 156, 158 and 164 are applied to the D/A converters 122, 124 before being conveyed to the video game 113 via control lines 126 and 128. The control signals generated by the computer 112 as a result of processes 156, 160 and 166 and processes 156 and 162 are conveyed directly to the video game 113 via control line 130.

In addition to the above, the microprocessor 118 also generates signals which are conveyed to the display 114 representing the captured image 168 superimposed on the image information 136 stored in memory 116 to provide visual feedback to the participant 108.

The operation of the system 100 will be now described with particular emphasis on the processing of the field of view 106 captured by the video camera 102 as an image which is digitized and transferred to the video RAM 120 in the computer 112 via the video digitizer 110 and with reference to FIGS. 6 to 9.

When a participant 108 is positioned in the field of view 106 of the video camera 102, the captured video image is conveyed to the video digitizer 110 and converted into digital data in the form of an array of bits (ie a bitmap), each bit representing one pixel of the video image. The digital data is in turn applied to the computer 112 wherein it is stored in the video RAM 120 in the form shown in FIG. 2. Once the digital data has been stored in the video RAM, it is conveyed to the microprocessor 118 (block 170 in FIG. 9). At this time, the microprocessor 118 retrieves the bitmaps 144, 146, 148 from the memory 116 and performs the AND function 154 on the digital data representing the captured image and the bitmaps. The AND functions 154 performed on the bitmaps and the corresponding portion of the captured image digital data received by the video RAM 120 are performed separately and on a priority basis. Namely, the microprocessor 118 performs the AND function 154 on the captured image digital data using area 1 bitmap 144 firstly, area 2 bitmap 146 secondly and area 3 bitmap 148 lastly, if necessary.

If the participant 108 is positioned in the field of view 106 so that the entire areas of interest 138, 140 and 142 are visible in the captured image, the AND function 154 for each AND operation performed by the microprocessor 118 results in the generation of a resultant bitmap having only logic low "0" bits. When this occurs, the microprocessor 118 provides no control signals to the D/A converters 122, 124 or to the control line 130. However, the microprocessor 118 conveys signals to the display 114 representing the captured image 168 superimposed on the image information 136 so that the participant 108 is capable of determining his/her position relative to the areas of interest defined within the field of view 106.

When the participant 108 is positioned or moves so that at least a portion of the participant is located in one or more areas of interest within a video frame and is captured as an image by the video camera, the AND function 154 generates a resultant bitmap having at least one logic high "1" bit for each area of interest in which the participant is located.

FIG. 8 illustrates the output of the display 114 when the participant 108 standing in front of the background 104 within the field of view 106 and is positioned to obscure a portion of area of interest 138 and area of interest 140. The position of the participant 108 in this manner causes the AND function 154 to generate resultant bitmaps (see FIG. 5 for example) having logic high "1" bits therein for both the area 1 bitmap 144 and the area 2 bitmap 146. As mentioned previously, when the AND function 154 is being performed by the microprocessor 118, it is performed on a priority basis and thus, the AND function is performed first on the captured image digital data and the area 1 bitmap 144 (blocks 172 and 174) to form a resultant bitmap.

If the resultant bitmap from this operation includes a logic high "1" bit therein (block 176), the microprocessor 118 performs additional processes on the resultant bitmap. Firstly, to avoid operation of the dependant control device 113 due to the generation of spurious bits and noise in the video image signal generated by the video camera 102, the results of the AND function 154 are filtered via function 156. In particular, the microprocessor 118 compares the number of logic high "1" bits in the resultant bitmap with a predetermined threshold value (block 178). If the resulting number of logic high "1" bits in the bitmap is below the predetermined threshold value, the logic high "1" bits generated by the AND function 154 are considered to have resulted due to noise and the resultant bitmap is ignored (line 179). When this occurs, the microprocessor 118 returns to the AND function 154 to perform the AND operation on the area 2 bitmap 146 and the captured image digital data (blocks 180 and 182). However, when the resultant bitmap includes a number of logic high "1" bits greater than or equal to the threshold value, further processing of the resultant bitmap is performed.

In the example of FIG. 8, the first area of interest 138, area 1, represents movement of the video game joystick. Accordingly movement of the participant 108 within this area of interest is detected by the computer 112 which in turn provides signals to the video game 113 via the D/A converters 122, 124 to move an active element displayed by the video game in a manner analogous to that which occurs when using a conventional joystick. In particular, the area of interest 138 is shown as a rectangle upon which the words "Up", "Down", "Left" and "Right" are shown. Movement of the participant 108 towards the various words causes the computer 112 to convey signals to the video game 113 which in turn causes the video game 113 to move the active element in accordance with the word. The amount of movement of the active element is determined by the position of the participant within the area of interest 138 relative its borders as will be described.

To achieve the above described operation, once the noise filtering process 156 has been complete, the microprocessor 118 examines the resultant bitmap to determine the leftmost and rightmost "active" pixels in the bitmap, ie. those representing portions of the area of interest 138 obscured by the participant 108 and which cause the AND function 154 to generate a logic high "1" bit. Once this is done, the positions of the active pixels or logic high "1" bits are used to calculate an active horizontal midpoint within the area of interest 138. Similarly, the uppermost and lowermost active pixels within the area of interest are used to calculate an active vertical midpoint. The horizontal and vertical midpoints are calculated by the microprocessor 118 via function 158 in the manner set forth below.

To calculate the leftmost active pixel within the resultant bitmap, the microprocessor 118 examines the pixels associated with each column in the resultant bitmap, one column at a time, in a left to right manner. Once the leftmost active pixel is determined, the microprocessor 118 stores the column number in which that active pixel is located. The rightmost pixel is detected in a very similar manner, by starting at the rightmost column in the resultant bitmap and proceeding left, one column at a time until an active pixel is found. The active horizontal midpoint is then calculated by adding the two column values and dividing the resultant sum by two.

The active vertical midpoint is determined using the resultant bitmap by examining the uppermost row therein and then each lower row in turn until the first active pixel in a row is detected. The lowermost pixel is determined in a similar manner starting at the lowermost row and examining each higher row in turn until an active pixel in a row is detected. The active vertical midpoint is determined by averaging the values of the uppermost and lowermost rows.

By starting at the uppermost, bottommost, leftmost and rightmost row or column as appropriate, the determination of the active midpoints is quickly performed. These active midpoints are then used to provide an analogous representation of a two-dimensional joystick.

Once the horizontal and vertical midpoints have been calculated in the manner described above (block 184), the microprocessor 118 uses the results to generate digital output signals (block 184) via function 164 which are conveyed to the D/A converters 122, 124 (block 186). The digital value of the output signals is dependant on the calculated position of the horizontal and vertical midpoints within the area of interest 138. The determination of the horizontal midpoint causes the microprocessor 118 to convey a digital value to D/A converter 122 while the determination of the vertical midpoint causes the microprocessor 118 to convey a digital value to D/A converter 124. The D/A converters in turn generate an analog voltage having a magnitude dependant on the digital value received from the microprocessor 118. The analog voltages are received by the video game 113 via the control lines 126, 128 causing the video game to move the active element in the video game display in accordance with the received voltages and hence in accordance with the words in the area of interest 138.

In the present case, the properties of area 1 are defined as follows. The righthand border of area 1 is assigned a digital "0" value while the lefthand border of area 1 is assigned a digital "10" value. Horizontal positions between these borders moving from right to left are assigned different values increasing as one moves from right to left. In addition, the lower border of area 1 is similarly assigned a digital "0" value while the upper border of area 1 is assigned a digital "10" value. Vertical positions between the upper and lower borders are assigned different digital values having a value which increases as one moves from the bottom to the top.

Thus, if the participant 108 is positioned within the area of interest 138 so that the horizontal and vertical midpoints are both determined to be located at the center of the area of interest, the microprocessor 118 would convey digital "5" values to both D/A converters 122, 124 which in turn would output appropriate voltage levels on the control lines 126, 128. As the participant 108 moves to the right within area of interest 138, the digital value applied to D/A converter 122 decreases or conversely, if the participant 108 moves to the left, the digital value increases. The digital value applied to the D/A converter 124 is varied in a similar manner, increasing as the participant 108 moves up and decreasing as the participant 108 moves down within the area of interest 138.

Once the active midpoints have been calculated and used to control the movement of the active element displayed by the video game 113, the microprocessor 118 performs the AND function 154 on the area 2 bitmap 146 and the corresponding captured image digital data (blocks 182 and 184). Since the participant 108 is shown in FIG. 8 to occupy a portion of the area of interest 140, the resultant bitmap of this AND function includes logic high "1" bits (block 190). Once this is determined, the microprocessor 118 performs the noise filtering function 156 and if the number of logic high "1" bits is detected as being above the threshold (block 192), the microprocessor 118 examines the number of bits in the resultant bitmap having logic high "1" values to determine the proportion of the resultant bitmap having logic high "1" bits and hence, the proportion of the area of interest 140 which is occupied by the participant 108. This operation is represented by function 160 (block 193).

Once this is done, the microprocessor 118 generates an output signal in the form of a square wave via function 166 oscillating between logic low "0" and logic high "1" values with the frequency of the square wave being dependant on the proportion of the area of interest 140 that is obscured by the participant 108. The square wave is then applied to the fire button control line 130 and is received by the video game to simulate the rapid pressing and releasing of a fire button on the video game 113 (block 194).

For example, if the participant 108 is detected as occupying 10% of the area of interest 140, the square wave generated by the microprocessor 118 has a frequency of 2 cycles per second. As the participant occupies more of the area of interest, the frequency of the square wave is proportionally increased. If the participant occupies 50% of the area of interest, the output square wave has a frequency of 10 cycles per second. The generated square wave is then applied to the control line 130 and conveyed to the video game 113 causing the video game to respond in the appropriate manner. This provides a variable speed, rapid fire, feature in the video game, allowing continuous bursts to be fired in the video game simply by occupying different proportions of the specified area of interest 140 within the field of view 106 of the video camera 102. Once the microprocessor 118 has completed the process with respect to area of interest 140, the microprocessor resets awaiting receipt of the next frame of digital information received by the video RAM 120 from the video camera via the video digitizer (block 195).

However, if the resultant bitmap generated by the AND function 154 with respect to the area 2 bitmap is detected as having no logic high "1" bits or fewer than the threshold number of logic high "1" bits, the third area of interest 148, area 3 is examined by the microprocessor 118 (line 196). Similar to the process previously described, the microprocessor 118 performs the AND function 154 on the area 3 bitmap 148 and the corresponding captured image digital data (blocks 198 and 200). The resultant bitmap is then examined to determine whether the resultant bitmap includes any logic high "1" bits (block 201 ) and if so whether the number of logic high "1" bits therein exceeds the threshold value (block 202). If the number of logic high "1" bits does not exceed the threshold requirement, the microprocessor resets (block 195) awaiting receipt of the next frame of digital information received by the video RAM 120 from the video camera via the video digitizer 110.

However, if the threshold value is met, the microprocessor provides a logic high voltage on the fire button control line 130 which is conveyed to the video game 130 (block 204). This allows the participant to cause the active element in the video game 113 to fire a single "shot" by obscuring a portion of the area of interest 142 in the field of view of the video camera 102. The logic high value applied to the fire button control line 130 by the microprocessor 118 returns to a logic low value when the participant 108 is detected as having moved out of the area of interest 142 during a frame captured by the video camera 102. Once the microprocessor 118 has completed this operation, it resets (block 195) awaiting receipt of the next frame of digital information received by the video RAM 120 via the video camera and video digitizer 110.

It should be realized that while the microprocessor is processing the captured image digital data in the manner described above, the microprocessor 118 also outputs signals to the display 114 so that the display provides visual feedback to the participant. This permits the participant 108 to gauge his/her position and move within the field of view 106 of the video camera 102 to occupy the appropriate areas of interest as desired.

It should also be realized that although the system 100 has been shown as including a separate display 114 to provide visual feedback to the participant, the display is not necessary in all environments. For example, in the present system 100, movement of the participant in the field of view causes the video game display to change due to the generation of control signals by the computer 112. Thus, the participant can use the video game display solely or the movement or operation of another dependant control device to gauge their position within the field of view.

Although the noise filtering technique used by the microprocessor 118 has been defined as requiring a predefined minimum number of pixels within the area of interest to be determined as active before any further processing is done by the microprocessor with respect to that area of interest, it should be realized that other types of thresholds may be implemented. For example, in environments with a large amount of electronic noise present, or when low cost or simple components are used, it may be desirable to require that two or more adjacent pixels be active before determining that the area of interest is indeed active.

Also, although the computer 112 is shown to provide output to the dependant control device via discrete hardware lines, it should be apparent to one of skill in the art that if the device to be controlled is computer-based, a control bus may be used to provide the control signals to the dependant control device. Thus, the bus would allow the direct interconnection of the microprocessor 118 to the device to be controlled.

The present invention is not limited to up, down, left and right functions, or fire button functions for video games. It is further contemplated that the present invention may be favourably employed in inter-active training systems, motor coordination training systems for handicapped or disabled persons, etc.

For example, the present system 100 may also be used to operate and control a robotic arm or arms. In this embodiment, the output of the computer 112 resulting from movement of the participant within the area of interest can be used to move the robotic arm within a pair of perpendicular planes. The output of the computer 112 resulting from the positioning of the participant within the area of interest 140 may be used to control movement of the hand on the robotic arm between opened and closed conditions with the hand being fully open when the participant totally obscures the area of interest and fully shut when the area of interest is vacant. The output of the computer 112 due to the positioning of the participant in the area of interest 142 may be used to control yet another feature of the robotic arm and need not be limited towards ON/OFF type signals. The computer 112 may generate signals in a similar manner to that described with respect to the areas of interest 138 and 140.

Furthermore, the microprocessor may also be conditioned to examine an area of interest in more than one manner and generate multiple control signals. For example, in the case of using the present system to operate a dependant control device having an element moveable in three dimensions, the microprocessor may examine an area of interest to determine the horizontal and vertical midpoints to control movement of the element in two dimensions and may also examine the proportion of the same area of interest occupied by the participant to generate a control signal suitable for controlling movement of the element in the third dimension.

Figure 10:
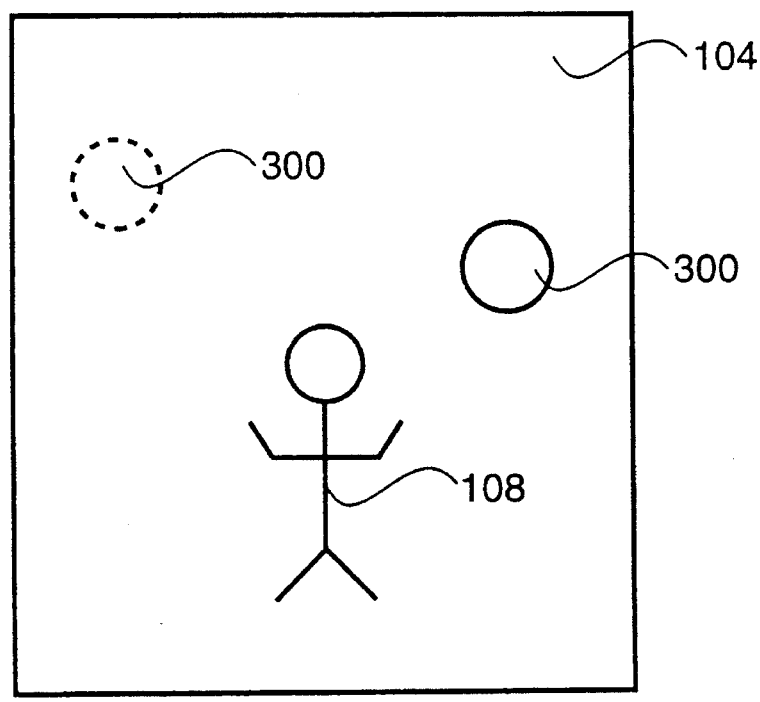
FIG. 10 is a schematic view of a portion of another embodiment of the present video image based control system.
Figure 13:
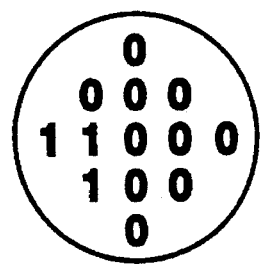
FIG. 13 is a view of a bitmap generated by the system shown in FIG. 10.
Figure 9B:
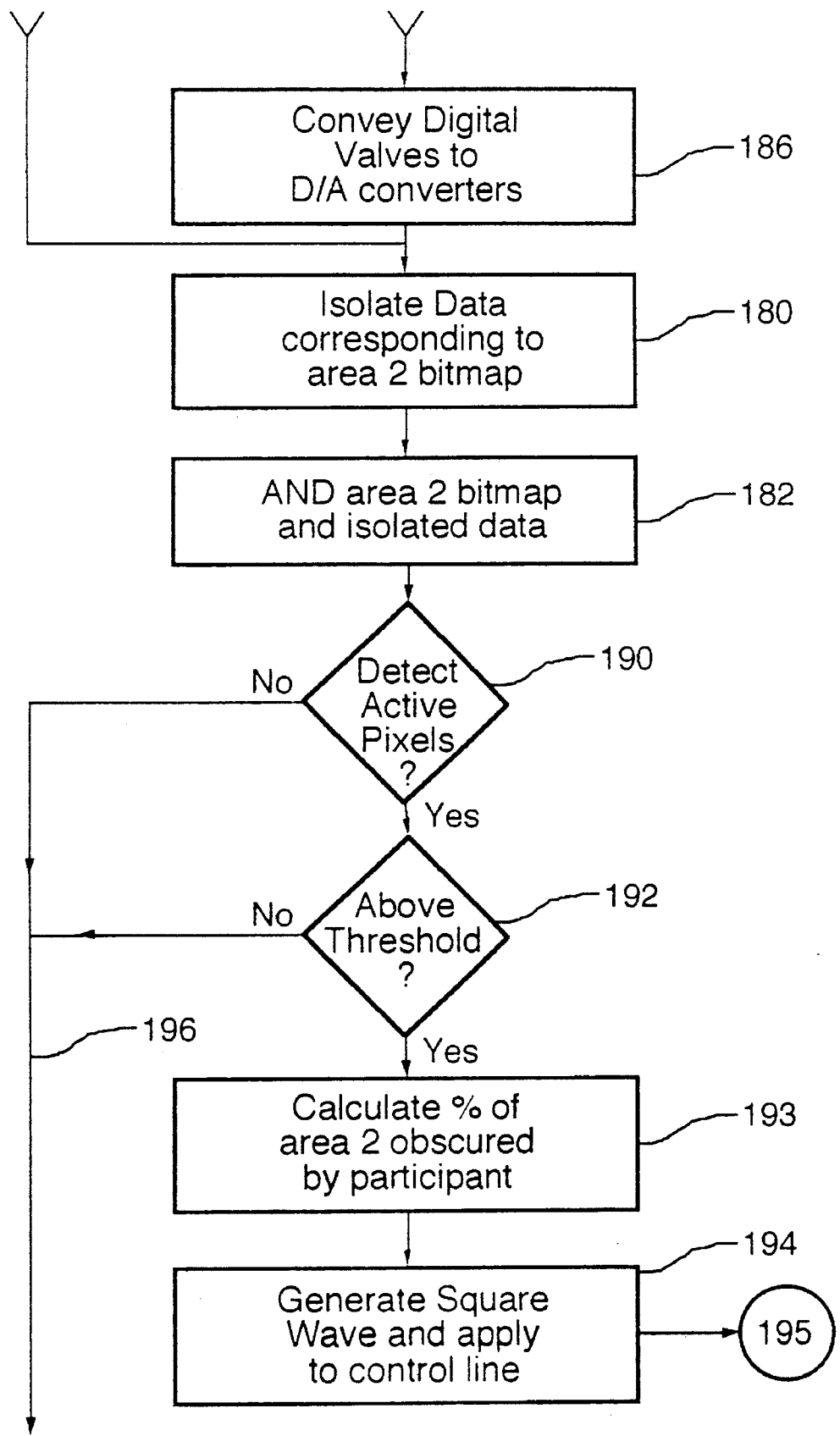
Figure 9C:
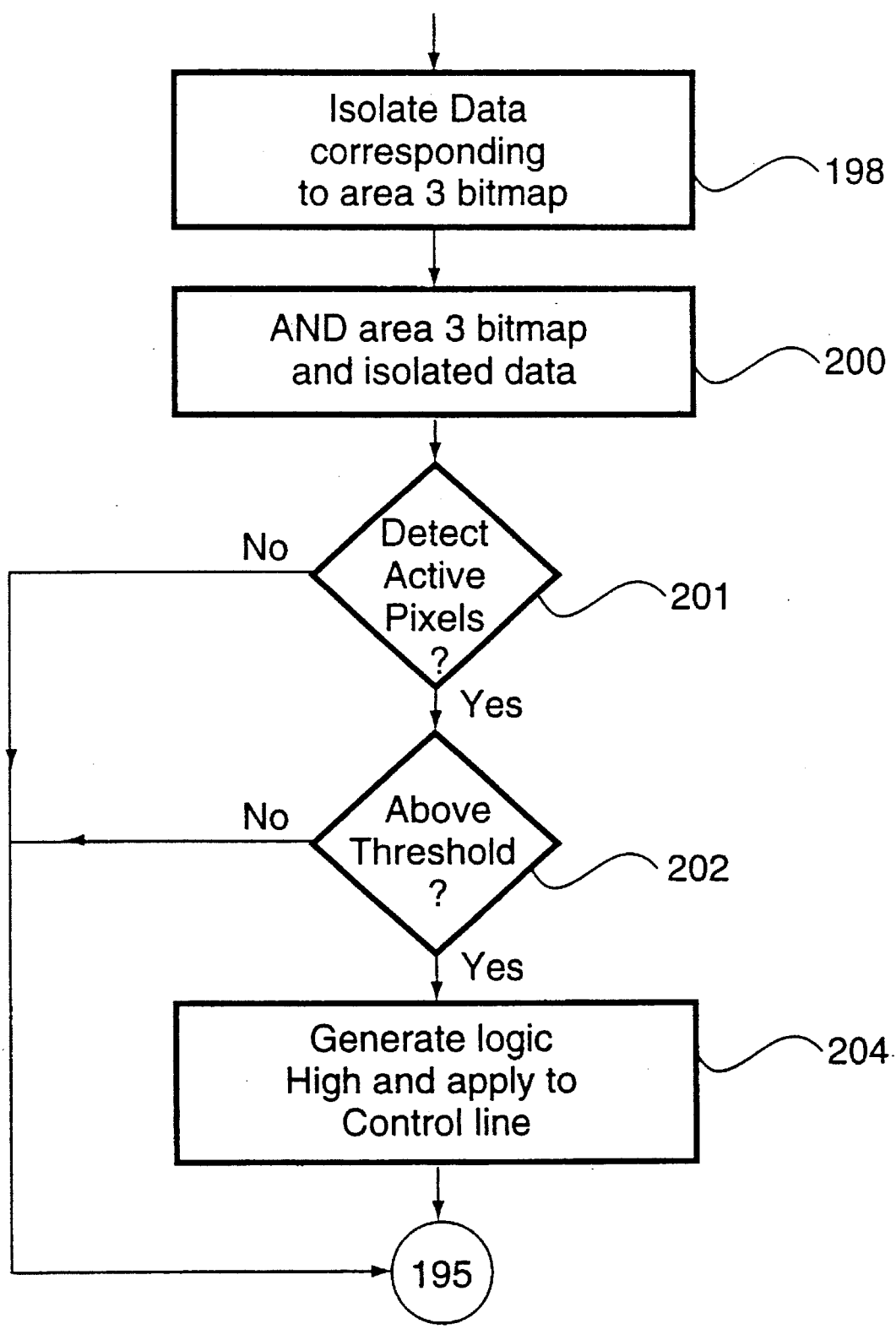

Referring now to FIGS. 10 and 13 another embodiment of the present system is shown. In this embodiment like reference numerals will be used to indicate identical components for clarity. The system in this embodiment includes the same components as system 100 but processes the captured image digital data stored in the video RAM 120 in a different manner to that previously set forth as will be described. In particular, in this embodiment, the field of view 106 includes only a single area of interest 300 in the form of a circle. However, the area of interest is not fixed within the field of view as described previously but rather moves within the field of view in accordance with the movement and positioning of the participant.

Figures 11, 12:
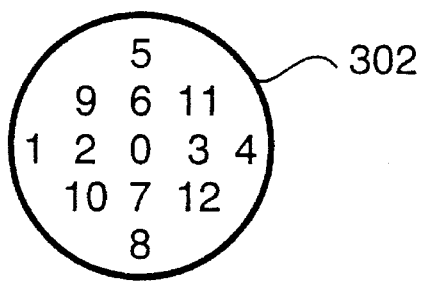
FIG. 11 is a schematic view of a bitmap used in a hit vector function used in the embodiment shown in FIG. 10.
FIG. 12 is a table of vector values associated with the pixels in the bitmap illustrated in FIG. 11.

As can be seen from FIG. 11, the bitmap 302 representing the area of interest 300 has each pixel or bit therein assigned a logic high "1" bit. In this manner when the participant 108 is positioned in the field of view 106 so that at least a portion of the participant is located in the area of interest 300, the AND function returns a resultant bitmap having at least one logic high "1" bit. However, in addition to this, each pixel in the bitmap 302 is assigned a value which is associated with an X and Y co-ordinate found in a look-up table 304 stored in the memory 116. The look-up table 304 is shown in FIG. 12. The X and Y co-ordinates assigned to each pixel represent vectors which are used by the microprocessor 118 to generate appropriate control signals. The control signals in turn are used to control the operation of a dependant control device. In the present example, the bitmap 302 shown in FIG. 11 can be used to simulate a ball and the system can be used to control a dependant control device depending on the position of the participant with respect to the ball as will be described.

In operation, when the video camera 102 has captured an image of the field of view 106 and the image has been digitized and conveyed to the video RAM 120, the microprocessor 118 performs a logical AND on the captured image digital data and the bitmap 302 in the memory 116 to determine the pixels in the area of interest 300 if any which are obscured by the participant 108. Once the pixels have been determined, the microprocessor 118 assigns the pixels their value in accordance with the bitmap and then determines the X and Y co-ordinates associated with the assigned values using the look-up table 304. The X and Y co-ordinates assigned to each pixel are then summed to form a "hit vector" which is used to control the dependent control device as will be described in the following example.

If the bitmap shown in FIG. 11 represents a volleyball in a video game and the participant is positioned so that the pixels assigned values 1, 2 and 10 within the area of interest are obscured, the microprocessor 118 generates a resultant bitmap having the form shown in FIG. 13. The logic high "1" bits in the resultant bitmap are given their assigned values by the microprocessor 118. Thereafter, the X and Y co-ordinates associated with the assigned values 1, 2 and 10 are determined. Using the above example, the microprocessor 118 calculates the hit vector by taking the sum of:

(1,0)+(5,0)+(3,3)=(9,3)

Once the hit vector is determined, the microprocessor 118 outputs a digital "9" value to D/A converter 122 and a digital "3" value to D/A converter 124. The D/A converters in turn provide analog voltages to the video game which in turn causes the ball to move across the screen of the video game in accordance with the generated signals. In this example,
the video game moves the center of the ball shown on the video game display in a diagonal line a distance of nine pixels horizontally and three pixels vertically. At the same time, the microprocessor 118 updates the bitmap information so that it "moves" within the field of view in a manner similar to the location of the movement of the ball in the video game (ie the center of the bitmap moves nine bits horizontally and three bits vertically). Thus, when the participant wishes to hit the ball, the area of interest bitmap 302 corresponds to the ball location as shown by the video game so that when the participant touches the ball, the AND function performed by the microprocessor yields logic high "1" bits in the resultant bitmap. In this manner, the video image control system can be used to simulate a participant hitting a volleyball.

It should be understood that weighted vector masks can be employed in horizontal or vertical embodiments as well as the cartesian system described above. Also, additional areas of interest may be located within the field of view to permit a number of participants to pass the ball back and forth allowing for multiple user functions.

In addition to the above, the present system 10 can also measure the speed at which an object moves through an area of interest using the leftmost and rightmost tracking methods described previously. When operating in this manner, as an object moves across an area of interest, it is captured as an image by the video camera. The image is convened into a bitmap and is stored in the video RAM 120 in the manner previously described. Successive frames captured by the video camera are also converted into bitmaps and stored in the video RAM. The active pixels in bitmaps generated for successive frames captured by the video camera 102 are compared to determine the amount of movement of the object within the area interest. Since the time taken between successive frames captured by the video camera 102 is known, the velocity of the object moving within the field of view can be determined.

The results of the velocity determination can be used to control the operation of a dependant control device. For example, The present system can be used as a traffic watch system wherein the microprocessor 118 provides an output signal to turn on a recorder when a vehicle is detected as travelling above a predetermined velocity through the area of interest within the field of view of a video camera. Alternatively, the speed and direction at which an object crosses an area of interest can be used to launch a graphic image on a display such as a basketball towards a graphic image of a hoop or to vary the speed of the volleyball described above.

I claim:

1. An interactive video image based control system comprising:

video imaging means for scanning a field of view occupied by a participant and taking successive images of said field of view;

first processing means in communication with said video imaging means and converting the images taken by said video imaging means into digital video information;

memory means storing digital area of interest information concerning at least one predetermined area of interest within said field of view;

second processing means examining said digital area of interest information in said memory means and said digital video information to determine whether at least a portion of any part of said participant is in said at least one area of interest and the proportion of said at least one area of interest occupied by said participant, said processing means generating output signals having magnitudes dependent on the proportion of said at least one area of interest occupied by said participant; and display means to display a superimposed image of said at least one area of interest and a representation of said participant within said field of view, said display means: (i) providing visual feedback to said participant of the location of said participant relative to said at least one area of interest, and (ii) allowing said participant to interact with said one area of interest to modify said output signals.

2. A system as defined in claim 1 wherein at least two areas of interest are predefined within said field of view, said processing means examining the digital area of interest information in said memory means associated with each of said at least two areas of interest and said digital video information to determine whether said participant is located in any one or all of said at least two areas of interest.

3. A system as defined in claim 2 wherein the digital area of interest information is examined by said processing means in a predetermined order to determine whether said participant is located in any one or all of the at least two areas of interest.

4. A system as defined in claim 3 wherein said digital video information associated with each image is in the form of a bitmap representing said field of view, said memory means storing bitmaps representing said at least two areas of interest within said field of view, said processing means performing a logic function on the bitmaps in said memory means and the bitmap representing the field of view to determine whether said participant is located in any one or all of said at least two areas of interest.

5. A system as defined in claim 4 wherein said logic function is an AND operation.

6. A system as defined in claim 3 wherein said digital video information associated with each image is in the form of a bitmap representing said field of view, said memory means storing bitmaps representing said at least one area of interest within said field of view, said processing means performing a logic function on the bitmaps in said memory means and the bitmap representing the field of view to determine whether said participant is located in said at least one area of interest.

7. A system as defined in claim 6 wherein said logic function results in the generation of a third bitmap, said threshold portion of said at least one area of interest being either a predetermined number of logic high bits or a pattern of contiguous logic high bits in said third bitmap.

8. A system as defined in claim 7 wherein said logic function is an AND operation.

9. A system as defined in claim 1 wherein said processing means requires a threshold portion of said at least one area of interest to be occupied by said participant before said output signals are generated.

10. A system as defined in claim 1 wherein said output signals have magnitudes linearly dependent on said proportion.

11. An interactive video image based control system comprising:

video imaging means for scanning a field of view occupied by a participant and taking successive images of said field of view;

first processing means in communication with said video imaging means and converting the images taken by said video imaging means into digital video information;

memory mean storing digital area of interest information concerning at least one predetermined area of interest within said field of view;

second processing means examining said digital area of interest information in said memory means and said digital video information to determine whether at least a portion of any part of said participant is in said at least one area of interest and-further determining the horizontal and vertical midpoints of the portion of said participant within said at least one area of interest, said second processing means generating output signals having magnitudes dependent on the determined horizontal and vertical midpoints; and display means to display a superimposed image of said at least one area of interest and a representation of said participant within said field of view, said display means: (i) providing visual feedback to said participant of the location of said participant, relative to said at least one area of interest, and (ii) allowing said participant to interact with said one area of interest to modify said output signals.

12. A system as defined in claim 11 wherein at least two areas of interest are predefined within said field of view, said processing means examining the digital area of interest information in said memory means associated with each of said at least two areas of interest and said digital video information to determine whether said participant is located in any one or all of the at least two areas of interest.

13. A system as defined in claim 12 wherein the digital area of interest information is examined by said processing means in a predetermined order to determine whether said participant is located in any one or all of said at least two areas of interest.

14. A system as defined in claim 13 wherein said digital video information associated with each image is in the form of a bitmap representing said field of view, said memory means storing bitmaps representing said at least two areas of interest within said field of view, said processing means performing a logic function between the bitmaps in said memory means and the bitmap representing the field of view to determine whether said participant is located in any one or all of the at least two areas of interest.

15. A system as defined in claim 14 wherein said logic function is an AND operation.

16. A system as defined in claim 11 wherein said processing means requires a threshold portion of said at least one area of interest to be occupied by said participant before said output signals are generated.

17. A system as defined in claim 18 wherein said digital information associated with each image is in the form of a bitmap representing said field of view, said memory means storing a bitmap representing said at least one area of interest within said field of view, said processing means performing a logic function on the bitmap in said memory means and the bitmap representing the field of view to determine whether said participant is located in said at least one area of interest.

18. A system as defined by claim 17 wherein said logic function results in the generation of a third bitmap, said threshold portion of said at least one area of interest being either a predetermined number of logic high bits or a pattern of contiguous logical high bits in said third bitmap.

19. A system as defined in claim 18 wherein said logic function is an AND operation.

20. An interactive video image based control system comprising:

video imaging means for scanning a field of view occupied by a participant and taking successive images of said field of view;

first processing means in communication with said video imaging means and converting the images taken by said video imaging means into digital video information;

memory means storing digital area of interest information concerning at least first and second predetermined areas of interest within said field of view;

second processing means examining said digital area of interest information in said memory means and said digital video information to determine whether at least a portion of any part of said participant is in any one or both of said first and second areas of interest, said second processing means generating first output signals when said participant is detected in said first area of interest and generating second output signals when said participant is detected in said second area of interest; and display means to display a superimposed image of said at least first and second areas of interest and a representation of said participant within said field of view, said display means: (i) providing visual feedback to said participant of the location of said participant relative to said at least first and second areas of interest, and (ii) allows said participant to interact with said one area of interest to modify said output signals.

21. A system as defined in claim 20 wherein said processing means examines said digital area of interest information in a predetermined order to determine whether said participant is in any one or both of said at least first and second areas of interest.

22. A system as defined in claim 21 wherein said first and second output signals are applied to a common external device.

23. A system as defined in claim 22 wherein said processing means determines the horizontal and vertical midpoints of the portion of said participant within said first area of interest to generate said first output signals and said processing means determines the proportion of said second area of interest occupied by said participant to generate said second output signals, said second output signals having magnitudes dependent on the proportion of said second area of interest occupied by said participant.

24. An interactive video image based control system comprising:

video imaging means for scanning a field of view occupied by a participant and taking successive images of said field of view;

first processing means in communication with said video imaging means and converting the images of said field of view into digital video information;

memory means storing digital area of interest information concerning at least one area of interest within said field of view, said memory means also storing a list of vectors, each vector being associated with a predefined portion of said area of interest;

second processing means examining said digital area of interest information in said memory means and said digital video information to determine whether at least a portion of any part of said participant is in said at least one area of interest and the portion of said at least one area of interest occupied by said participant, said second processing means further determining the vector associated with each of the portions of said at least area of interest occupied by said participant and calculating a resultant vector, said second processing means generating output signals having magnitudes dependent on the resultant vector; and display means to display superimposed image of said at least one area of interest and a representation of said participant within said field of view, said display means: (i) providing visual feedback to said participant and the location of said participant relative to said at least one area of interest, and (ii) allows said participant to interact with said one area of interest to modify said output signals.

25. A system as defined in claim 24 wherein said list of vectors is in the form of a look-up table.

26. A system as defined in claim 25 wherein said vectors are stored in said look-up table as X and Y co-ordinates.

27. A system as defined in claim 26 wherein said processing means performs summing operations on said vectors.

28. An interactive video image based control system comprising:

video imaging means for scanning a field of view occupied by a participant and taking successive images of said field of view;

first processing means in communication with said video imaging means and converting the images taken by said video imaging means into digital video information, said first processing means processing said digital video information to separate an active region of said participant from the remainder of said images and generating digital data representing said active region;

memory means storing digital area of interest information concerning at least one predetermined area of interest within said field of view;

second processing means examining said digital area of interest information and said digital data to determine whether said active region is in at least one area of interest and the proportion of said at least one area of interest occupied by said active region, said second processing means generating output signals having magnitudes dependent on the proportion of said at least one area of interest occupied by said active region; and display means to display a superimposed image of said at least one area of interest and a representation of said participant within said field of view, said display means: (i) providing visual feedback to said participant of the location of said active region relative to said at least one area of interest, and (ii) allowing said participant to interact with said one area of interest to modify said output signals.

29. A system as defined in claim 28 wherein the outer boundaries of said active region are defined by the outer periphery of said participant.

30. A system as defined in claim 28 wherein said representation is an image of said participant.

31. An interactive video image based control system comprising:

video imaging means for scanning a field of view occupied by a participant and taking successive images of said field of view;

first processing means in communication with said video imaging means and converting the images taken by said video imaging means into digital video information, said first processing means processing said digital video information to separate an active region of said participant from the remainder of said images and generating digital data representing said active region;

memory means storing digital area of interest information concerning at least one predetermined area of interest within said field of view;

second processing means examining said digital area of interest information and said digital data to determine whether said active region is in said at least one area of interest and the portion of said at least one area of interest occupied by said active region and further determining the horizontal and vertical midpoints of the portion of said active region within said at least one area of interest, said second processing means generating output signals having magnitudes dependent on the determined horizontal and vertical midpoints; and display means to display a superimposed image of said at least one area of interest and a representation of said participant within said field of view, said display means: (i) providing visual feedback to said participant of the location of said active region relative to said at least one area of interest, and (ii) allowing said participant to interact with said one area of interest to modify said output signals.

32. A system as defined in claim 31 wherein the outer boundaries of said active region are defined by the outer periphery of said participant.

33. A system as defined in claim 31 wherein said representation is an image of said participant.

34. An interactive video image based control system comprising:

video imaging means for scanning a field of view occupied by a participant and taking successive images of said field of view;

first processing means in communication with said video imaging means and converting the images taken by said video imaging means into digital video information, said first processing means processing said digital video information to separate an active region of said participant from the remainder of said images and generating digital data representing said active region;

memory means storing digital area of interest information concerning at least first and second areas interest within said field of view;

second processing means examining said digital area of interest information and said digital data to determine whether a portion of said active region is in one or more of said at least first and second areas of interest, said second processing means generating first output signals when said active region is detected in said first area of interest and generating second output signals when said active region is detected in said second area of interest; and display means to display a superimposed image of said at least first and second areas of interest and a representation of said participant within said field of view, said display means: (i) providing visual feedback to said participant of the location of said active region relative to said at least first and second areas of interest, and (ii) allows said participant no interact with said one area of interest to modify said output signals.

35. A system as defined in claim 34 wherein the outer boundaries of said active region are defined by the outer periphery of said participant.

36. A system as defined in claim 34 wherein said representation is an image of said participant.

37. An interactive video image based control system comprising:

video imaging means for scanning a field of view occupied by a participant and taking successive images of said field of view;

first processing means in communication with said video imaging means and converting the images taken by said video imaging means into digital video information, said first processing means processing said digital video information to separate an active region of said participant from the remainder of said images and generating digital data representing said active region;

memory means storing digital area of interest information concerning at least one predetermined area of interest within said field of view, said memory means also storing a list of vectors, each vector being associated with a predefined portion of said at least one area of interest;

second processing means examining said digital area of interest information in said memory means and said digital video information to determine whether said active region is in said at least one area of interest and the portion of said at least one area of interest occupied by said active region, said second processing means further determining the vector associated with each portion of said at least one area of interest occupied by said active region and calculating a resultant vector, said processing means generating output signals having magnitudes dependent on the resultant vector; and display means to display a superimposed image of said at least one area of interest and a representation of said participant within said field of view, said display means: (i) providing visual feedback to said participant of the location of said active region relative to said at least one area of interest, and (ii) allows said participant to interact with said one area of interest to modify said output signals.

38. An interactive video gaming system:

video imaging means for scanning a field of view occupied by a participant and taking successive images of said field of view:

memory means storing a game program;

processing means to execute said game program to play a game and being responsive to participant input to allow said participant to influence game play during execution of said game program, said processing means also processing said digital video information to separate an active region of said participant from the remainder of said images and generating digital data representing said active region; and display means to display said game during game play and to display a representation of said participant superimposed on said game to provide visual feedback to said participant of the location of said active region within said game, wherein during execution of said game program, game elements are displayed on said display means and movement of said participant within said field of view results in movement of said representation on said representation on said display means, said processing means examining said digital data to determine whether at least a portion of said active region is coincident with a portion of a game element displayed on said display means, said processing means generating said participant input when said active region is detected as being coincident with a least a portion of a game element displayed on said display means thereby to influence game play.

39. A system as defined in claim 38 wherein the outer boundaries of said active region are defined by the outer periphery of said participant.

40. A system as defined in claim 35 wherein said representation is an image of said participant.

41. A system as defined in claim 38 wherein said processing means examines said digital data to determine the proportion of said active region coincident with said game element and generates participant input to influence game play accordingly.

42. A system as defined in claim 38 wherein said processing means examines said digital data to determine the horizontal and vertical midpoint of the portion of said active region coincident with same game element and generates participant input to influence game play accordingly.

* * * * *